United States Patent
Wang et al.

(10) Patent No.: US 10,334,203 B2
(45) Date of Patent: Jun. 25, 2019

(54) THIN-PROFILE TELEVISION DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Na Wang, Shenzhen (CN); Cheng-Fa Chung, New Taipei (TW); Lei Liang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 68 days.

(21) Appl. No.: 15/604,823

(22) Filed: May 25, 2017

(65) Prior Publication Data

US 2018/0131896 A1    May 10, 2018

(30) Foreign Application Priority Data

Nov. 7, 2016 (CN) .......................... 2016 1 0983237

(51) Int. Cl.
*H04N 5/655* (2006.01)
*G02B 6/00* (2006.01)
*F21V 8/00* (2006.01)

(52) U.S. Cl.
CPC ............. *H04N 5/655* (2013.01); *G02B 6/009* (2013.01); *G02B 6/0025* (2013.01); *G02B 6/0031* (2013.01); *G02B 6/0068* (2013.01); *G02B 6/0073* (2013.01); *G02B 6/0083* (2013.01); *G02B 6/0085* (2013.01); *G02B 6/0086* (2013.01); *G02B 6/0088* (2013.01)

(58) Field of Classification Search
None
See application file for complete search history.

(56) References Cited

U.S. PATENT DOCUMENTS

| | | | | |
|---|---|---|---|---|
| 9,030,642 | B2 * | 5/2015 | Huang | G02F 1/133608 349/153 |
| 9,323,393 | B2 * | 4/2016 | Djordjev | G06K 9/0002 |
| 9,835,925 | B1 * | 12/2017 | Bull | G02F 1/167 |
| 2007/0152956 | A1 * | 7/2007 | Danner | G02F 1/161 345/107 |

(Continued)

FOREIGN PATENT DOCUMENTS

| | | |
|---|---|---|
| CN | 204350158 U | 5/2015 |
| TW | M453175 U1 | 5/2013 |

*Primary Examiner* — Reza Aghevli
(74) *Attorney, Agent, or Firm* — ScienBiziP, P.C.

(57) ABSTRACT

A thin-profile television includes a backplane, a display unit, a frame, and a driving printed circuit board. The backplane includes a flat first surface. The backplane and the frame, defining a first receiving space, receive the display unit and the driving printed circuit board. The frame includes a first front frame portion and a second front frame portion, the first front frame portion and the second front frame portion faces away from the backplane. The second front frame portion is convex relative to the first front frame portion. The driving printed circuit board is positioned between the backplane and the side frame portion and adjacent to the side frame portion.

14 Claims, 3 Drawing Sheets

(56) References Cited

U.S. PATENT DOCUMENTS

| | | | |
|---|---|---|---|
| 2008/0198098 A1* | 8/2008 | Gelbman | G06F 3/147 345/59 |
| 2011/0098083 A1* | 4/2011 | Lablans | G03B 35/00 455/556.1 |
| 2013/0258710 A1* | 10/2013 | Huang | G02F 1/133382 362/609 |
| 2013/0301297 A1* | 11/2013 | Hsiao | G02B 6/0085 362/612 |
| 2014/0347593 A1* | 11/2014 | Han | G02F 1/1309 349/54 |
| 2015/0261366 A1* | 9/2015 | Wong | G06F 1/1626 345/173 |
| 2016/0213173 A1* | 7/2016 | Xu | A47G 1/0622 |
| 2016/0313494 A1* | 10/2016 | Hamilton | G02B 6/0068 |
| 2017/0003536 A1* | 1/2017 | Chen | G06F 1/13338 |
| 2017/0061867 A1* | 3/2017 | Cok | G09G 3/3208 |
| 2017/0084671 A1* | 3/2017 | Hack | H01L 27/3225 |
| 2017/0167703 A1* | 6/2017 | Cok | F21V 23/003 |
| 2017/0186356 A1* | 6/2017 | Cok | G09G 3/2014 |
| 2018/0101047 A1* | 4/2018 | Li | G02F 1/133308 |

\* cited by examiner

THIN-PROFILE TELEVISION DEVICE

FIELD

The subject matter generally relates to a television, and more particularly, to a thin-profile television device.

BACKGROUND

Thin televisions include a rear cover and backlight modules mounted to the rear cover. A sum of a thickness of the rear cover and a thickness of the backlight module is about ½ to about ⅔ of total thickness of the thin television. Thus, when the thin-profile television device is mounted to a supporting surface by a bracket, the rear cover and the backlight module occupy a relatively large space.

BRIEF DESCRIPTION OF THE DRAWINGS

Implementations of the present technology will now be described, by way of example only, with reference to the attached figures.

DETAILED DESCRIPTION OF EMBODIMENTS

Figure 1:
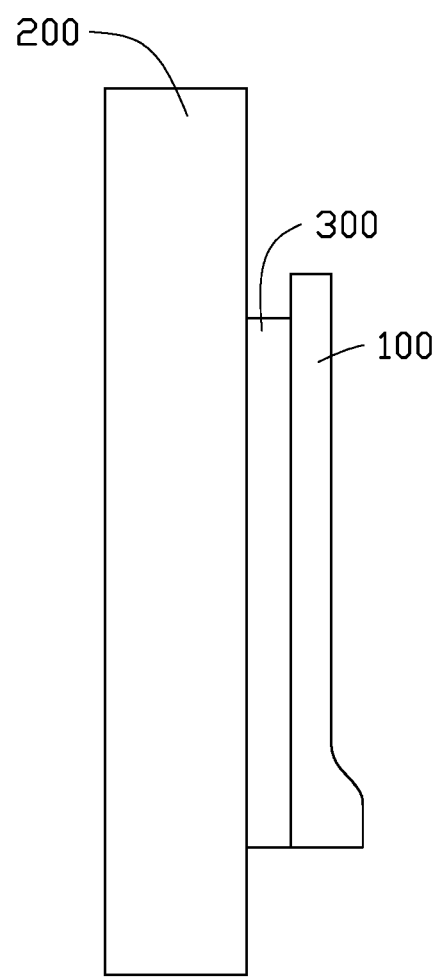
FIG. 1 is a diagrammatic view of an exemplary embodiment of a thin-profile television device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

The term "comprising," when utilized, means "including, but not necessarily limited to"; it specifically indicates open-ended inclusion or membership in the so-described combination, group, series and the like.

FIG. 1 illustrates an exemplary embodiment of a thin-profile television device 100. The thin-profile television device 100 can be mounted to a supporting surface 200 by a hanging bracket 300.

Figure 2:
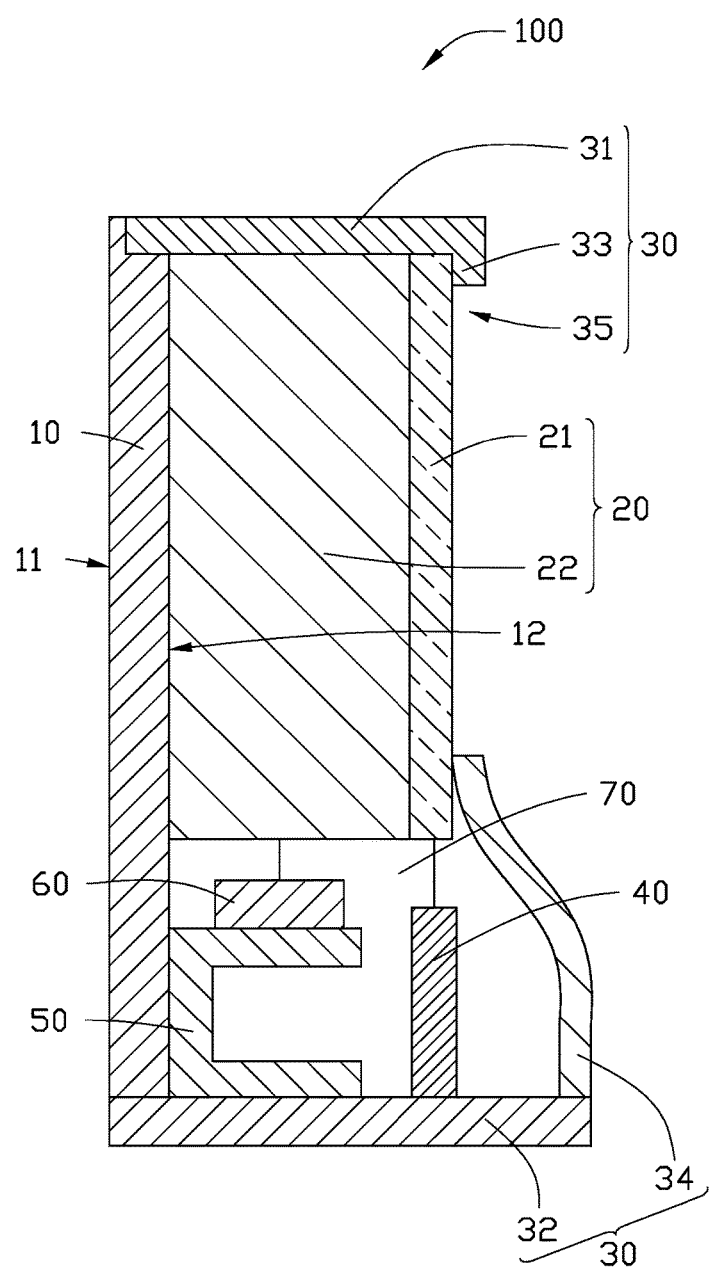
FIG. 2 is a cross-sectional view of the thin-profile television device of FIG. 1.

FIG. 2 illustrates that the thin-profile television device 100 includes a backplane 10, a display unit 20, a frame 30, a driving printed circuit board 40, a heat dissipation element 50, and an optical printed circuit board 60. The display unit 20 faces the backplane 10. The backplane 10 and the frame 30 cooperatively define a first receiving space 70. The display unit 20, the driving printed circuit board 40, the heat dissipation element 50, and the optical printed circuit board 60 are received in the first receiving space 70.

The backplane 10 includes a first surface 11 and the second surface 12. The second surface 12 faces away from the first surface 11. The first surface 11 is a flat surface and can be connected to the supporting surface 200 by the hanging bracket 300.

The display unit 20 includes a display screen 21 and a backlight module 22. The backlight module 22 is positioned between the backplane 10 and the display screen 21.

In at least one exemplary embodiment, the display screen 21 can be a liquid crystal display or a plasma panel. In at least one exemplary embodiment, the display screen 21 is a liquid crystal display.

The frame 30 can protect the display unit 20, the driving printed circuit board 40, the heat dissipation element 50, and the optical printed circuit board 60. The frame 30 includes an upper frame portion 31, a lower frame portion 32, a first front frame portion 33, and a second front frame portion 34. The upper frame portion 31 and the lower frame portion 32 are perpendicularly connected to opposite sides of the backplane 10. The lower frame portion 32 faces away from the upper frame portion 31. A width of the lower frame portion 32 is greater than a width of the upper frame portion 31. The first front frame portion 33 is parallel with the backplane 10 and perpendicularly connected to the upper frame portion 31. The second front frame portion 34 is connected to the lower frame portion 32 and faces away from the backplane 10. The second front frame portion 34 is adjacent to floor of a room when in use. An opening 35 is defined between the first front frame portion 33 and the second front frame portion 34 to expose the display screen 21. The first front portion 32 is flat. The second front frame portion 34 is convex relative to the first front frame portion 33.

The driving printed circuit board 40 is positioned between the backplane 10 and the second front frame portion 34. The driving printed circuit board 40 is electrically connected to the display screen 21 to drive the display screen 21.

The heat dissipation element 50 is positioned between the backplane 10 and the driving printed circuit board 40. The heat dissipation element 50 can dissipate heat generated by the display unit 20.

In at least one embodiment, the heat dissipation element 50 is a heat dissipation sink made by an aluminum extrusion process.

The optical printed circuit board 60 is electrically connected to the backlight module 22 to drive the backlight module 22, and positioned between the heat dissipation element 50 and the backlight module 22. In at least one embodiment, the optical printed circuit board 60 is positioned on the heat dissipation element 50.

Figure 3:
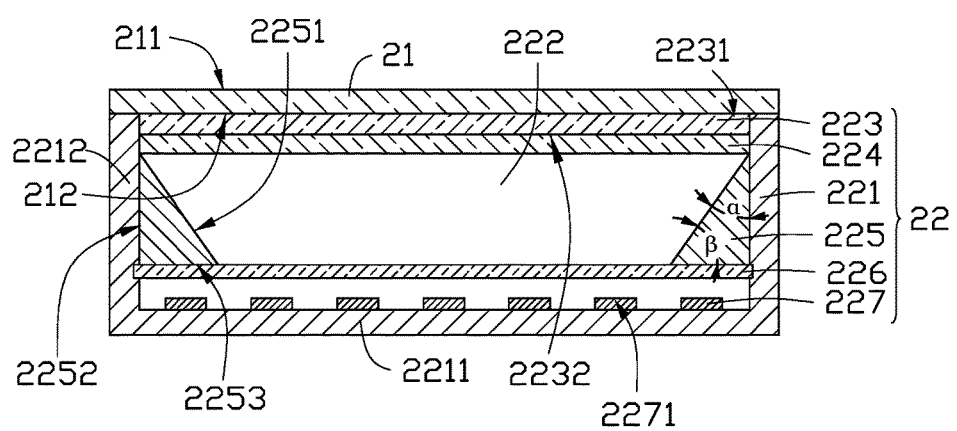
FIG. 3 is a cross-sectional view of a display unit included in the thin-profile television device of FIG. 2.

Referring to FIG. 3, the display screen 21 includes a display surface 211 and a non-display surface 212. The non-display surface 212 faces away from the display surface 211. The non-display surface 212 faces the backlight module 22.

In at least one embodiment, the backlight module 22 includes a fixing frame 221, a light guide plate 223, a diffusing film 224, at least one reflecting plate 225, a brightness enhancement film 226, and a number of backlight sources 227.

The fixing frame 221 includes a bottom frame portion 2211 and two side frame portions 2212 perpendicularly extending from opposite edges of the bottom frame portion 2211. The display screen 21 is formed on ends of the two side frame portions 2212 facing away from the bottom frame portion 2211. The display screen 21 and the fixing frame 221 cooperatively define a second receiving space 222. The light guide plate 223, the diffusing film 224, the reflecting plate 225, the brightness enhancement film 226, and the backlight sources 227 are received in the second receiving space 222.

The light guide plate 223 includes a first light emitting surface 2231 and a light incident surface 2232 facing away from the first light emitting surface 2231. The first light emitting surface 2231 faces the non-display surface 212. Two ends of the light guide plate 223 are fixed to the two side frame portions 2212.

The diffusing film 224 is in contact with the light incident surface 2232 of the light guide plate 223. Two ends of the diffusing film 224 are fixed to the two side frame portions 2212.

Each reflecting plate 225 is connected to one side frame portion 2212 and, in respect of light striking the two side frame portions 2212, the reflecting plates 225 reflect to the diffusing film 224 any light that strikes the two side frame portions 2212. Such light enters the light guide plate 223 and reduces loss of the light.

In at least one embodiment, the number of the reflecting plates 225 is two. Each reflecting plate 225 includes a reflecting surface 2251, a first connecting surface 2252, and a second connecting surface 2253. The second connecting surface 2253 is perpendicular to the first connecting surface 2252. The first connecting surface 2252 is connected to the side frame portion 2212. The second connecting surface 2253 is connected to the brightness enhancement film 226. The reflecting surface 2251 interconnects the first connecting surface 2252 and the second connecting surface 2253. The reflecting surface 2251 is inclined relative to the first connecting surface 2252 and the second connecting surface 2253 by a first angle, denoted as "$\alpha$", and a second angle denoted as "$\beta$", respectively. The first angle "$\alpha$" and the second angle "$\beta$" follow the function of: $\alpha+\beta=90°$. In at least one exemplary embodiment, $\alpha=\beta=45°$.

Two ends of the brightness enhancement film 226 are fixed to the two side frame portions 2212. The brightness enhancement film 226 faces the diffusing film 224. The brightness enhancement film 226 can improve the luminous efficiency of the backlight module 22.

The backlight sources 227 are positioned on the bottom frame portion 2211. Each of the backlight sources 227 includes a second light emitting surface 2271. The second light emitting surface 2271 faces the brightness enhancement film 226.

In at least one exemplary embodiment, the backlight sources 227 are arranged in a matrix on the bottom frame portion 2211.

The backlight sources 227 can be light emitting diodes or diode lasers.

In at least one exemplary embodiment, the optical printed circuit board 60 is electrically connected to the backlight sources 227.

With the above configuration, the first surface 11 of the backplane 10 is a flat surface which allows the thin-profile television device 100 to be mounted to any flat supporting surface. Furthermore, the second front frame portion 34 is convex relative to the first front frame portion 33, to receive the driving printed circuit board 40, the heat dissipation element 50, and the optical printed circuit board 60. Thus, a thickness of the thin television 100 is decreased which can save the total space occupied by the thin-profile television device 100.

The embodiments shown and described above are only examples. Many details are often found in the art such as the other features of the lead frame and light emitting diode package having the same. Therefore, many such details are neither shown nor described. Even though numerous characteristics and advantages of the present technology have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A thin-profile television device comprising:
a backplane, the backplane comprising a first surface, the first surface being a flat surface;
a frame facing away from the backplane, the backplane and the frame cooperatively defining a first receiving space;
a display unit received in the first receiving space; wherein the display unit comprises a display screen and a backlight module, the backlight module comprises a fixing frame, a light guide plate and a diffusing film; the fixing frame comprises a bottom frame portion and two side frame portions perpendicularly extending from two opposite edges of the bottom frame portion; the light guide plate comprises a light incident surface, the diffusing film contacts the light incident surface of the light guide plate, two ends of the diffusing film are fixed to the two side frame portions;
a driving printed circuit board electrical connected to the display screen and received in the first receiving space;
wherein, the frame comprises a first front frame portion and a second front frame portion; the first front frame portion and the second front frame portion face away from the backplane; an opening is defined between the first front frame portion and the second front frame portion to expose the display unit; the second front frame portion is convex relative to the first front frame portion; the driving printed circuit board is positioned between the backplane and the second front frame portion.

2. The thin-profile television device of claim 1, wherein the backlight module further comprises at least one reflecting plate, a brightness enhancement film, and a plurality of backlight sources.

3. The thin-profile television device of claim 2, wherein the display screen is formed on ends of the two side frame portions facing away from the bottom frame portion; the display screen and the fixing frame cooperatively define a second receiving space; the light guide plate, the diffusing film, the reflecting plate, the brightness enhancement film, and the backlight sources are received in the second receiving space.

4. The thin-profile television device of claim 2, wherein the display screen comprises a display surface and a non-display surface facing away from the display surface; the non-display surface faces the backlight module; the light guide plate further comprises a first light emitting surface the light incident surface faces away from the first light emitting surface; the first light emitting surface faces the non-display surface; two ends of the light guide plate are fixed to the two side frame portions.

5. The thin-profile television device of claim 2, wherein the at least one reflecting plate comprises a reflect surface, a first connecting surface, and a second connecting surface perpendicular to the first connecting surface; the first connecting surface is connected to one side frame portion; the second connecting surface is connected to the brightness enhancement film; the reflecting surface interconnects the first connecting surface and the second connecting surface.

6. The thin-profile television device of claim 5, wherein the reflecting surface is inclined relative to the first connecting surface and the second connecting surface by a first angle denoted as $\alpha$ and a second angle denoted as $\beta$, the first angle $\alpha$ and the second angle $\beta$ follow the function of: $\alpha+\beta=90°$.

7. The thin-profile television device of claim 5, wherein the first angle $\alpha$ and the second angle $\beta$ follow the function of: $\alpha=\beta=45°$.

8. The thin-profile television device of claim 2, wherein the two ends of the brightness enhancement film are fixed to the two side frame portions; the brightness enhancement film faces the diffusing film.

9. The thin-profile television device of claim 2, wherein the plurality of backlight sources is positioned on the bottom frame portion, each of the plurality of backlight sources comprises a second light emitting surface facing the brightness enhancement film.

10. The thin-profile television device of claim 2, further comprising a heat dissipation element, wherein the heat dissipation element is received in the first receiving space and positioned between the backplane and the driving printed circuit board.

11. The thin-profile television device of claim 2, further comprising an optical printed circuit board, wherein the optical printed circuit board is received in the first receiving space and electrically connected to the backlight module.

12. The thin-profile television device of claim 10, wherein, the optical printed circuit board is positioned between the heat dissipation element and the backlight module.

13. The thin-profile television device of claim 11, wherein the optical printed circuit board is positioned on the heat dissipation element.

14. The thin-profile television device of claim 1, wherein the frame comprises an upper frame portion and a lower frame portion, the upper frame portion and the lower frame portion are perpendicularly connected to opposite sides of the backplane, the lower frame portion faces away from the upper frame portion, a width of the lower frame portion is greater than a width of the upper frame portion.

* * * * *